United States Patent

Kull et al.

[11] Patent Number: 5,120,442
[45] Date of Patent: Jun. 9, 1992

[54] PROCESS FOR THE SIMULTANEOUS CHEMICAL AND BIOLOGICAL ELIMINATION OF SOLID AND LIQUID ORGANIC WASTE

[75] Inventors: Alfred Kull; Matthias Mather, both of Biberach; Hans-Joachim Schmeiss, Schemmerhofen, all of Fed. Rep. of Germany

[73] Assignee: Dr. Karl Thomae GmbH, Biberach an der Riss, Fed. Rep. of Germany

[21] Appl. No.: 701,560

[22] Filed: May 16, 1991

Related U.S. Application Data

[63] Continuation of Ser. No. 149,762, Jan. 29, 1988, abandoned.

[30] Foreign Application Priority Data

Feb. 7, 1987 [DE] Fed. Rep. of Germany ....... 3703824

[51] Int. Cl.⁵ ................................................. C02F 1/74
[52] U.S. Cl. ................................. 210/621; 210/629; 210/631; 210/759; 210/760; 210/765
[58] Field of Search ........ 210/607, 627, 614, 620–622, 210/629, 631, 752, 758–760, 763, 765

[56] References Cited

U.S. PATENT DOCUMENTS

| | | | |
|---|---|---|---|
| 3,530,067 | 9/1970 | Friedman | 210/759 |
| 3,660,277 | 5/1972 | McWhirter et al. | 210/627 |
| 4,009,100 | 2/1977 | Hess et al. | 210/627 |
| 4,029,574 | 6/1977 | Reiman | 210/627 |
| 4,162,971 | 7/1979 | Zlokarnik | 210/620 |
| 4,294,703 | 10/1981 | Wilms et al. | 210/759 |
| 4,940,546 | 7/1990 | Vogelpohl et al. | 210/628 |
| 5,039,416 | 8/1991 | Loew et al. | 210/631 |

Primary Examiner—Thomas Wyse
Attorney, Agent, or Firm—David E. Frankhouser; Alan R. Stempel; Mary-Ellen M. Timbers

[57] ABSTRACT

There is described a process for the simultaneous chemical and biological elimination of solid and liquid waste and apparatus for performing this process in the form of a loop reactor corresponding to FIG. 1 in conjunction with a specially designed nozzle which ensures an intimate mixing of substrate with air and the spraying-in of oxidizing agents while permitting only a short contact time between the oxidizing agents and the substrate.

4 Claims, 3 Drawing Sheets

PROCESS FOR THE SIMULTANEOUS CHEMICAL AND BIOLOGICAL ELIMINATION OF SOLID AND LIQUID ORGANIC WASTE

This is a continuation of application Ser. No. 149,762, filed Jan. 29, 1988 now abandoned.

The invention relates to a process for the simultaneous chemical and biological elimination of solid and liquid organic waste and apparatus for performing this process.

Residues from chemical manufacture, chemical waste, which cannot be recycled further and also many adjuvants, some of them contaminated, in liquid or solid form are disposed of, within the framework of the waste disposal services by dumping or burning and in some cases by sewage treatment. These methods of disposal are nowadays frequently unjustifiable both ecologically and economically.

The elimination of chemical waste by aerating bacterial cultures ("activated sludge process") in sewage treatment plants has hitherto very rapidly come up against certain limits of feasibility. The activated sludge plants which have been in use for decades require large-area open basins which take up a considerable surface area and volume and are a source of unpleasant smells (aerosol emission) particularly if surface aeration is used. Therefore, for some years, attempts have been made with some degree of success, to improve this situation by constructing clarifying towers operating with better aeration technology. The clarifying towers are sealed off from the outside, the air is introduced in fine bubbles, the oxygen contained therein is better absorbed due to a longer retention time and large phase interfaces. It was assumed that a high efficiency of oxygen uptake (in kg/kWh), combined with a minimal gas throughput, would make the clarifying towers superior to conventional activation tanks. The minimal gas throughput prevents excessive foaming and reduces the costs of the waste gas removal. A high oxygen consumption was supposed to be achieved by correspondingly designing the aeration plant, for example—the use of specific nozzles was particularly envisaged—and the reactor—which was supposed to have a certain height for the liquid column.

These reactors for the bacterial conversion of organic substrates to produce clarified sludge, water and carbon dioxide (we refer to the "tower biology" of Bayer AG and the "Biohoch-Reaktoren" [tall bio-reactors] of Hoechst AG, Biotechnology, Vol. 2, Verlag Chemie (1985), Tower-Shaped Reactors by M. Zlokarnik) have been further developed in recent years since the yield per unit of volume and time was still unsatisfactory and excessively large deposition tanks for the clarified sludge were still required. A further development in the form of a so-called compact reactor is described by E. A. Naundorf et al. in Chem. Eng. Process, 19 (1985) pages 229–233. This is a loop reactor in the form of a cylindrical container having a conduit pipe open at both ends inside it and a ratio of height to diameter of about 7:1. At the tip of the container is provided a two-substance nozzle which opens into the cylindrical conduit pipe. The air is passed through the inner cavity of the nozzle and the liquid to be treated is passed through the cavity between the cylinder forming the nozzle and a second cylinder surrounding the first cylinder.

A jet of liquid is formed, in the form of a hollow cylinder. The air is sucked into this hollow cylinder and distributed therein, and the circulation of liquid causes the circulating two-phase liquid to be distributed, forming very small bubbles, and this two-phase component circulating on the outside of the spray jet is released outwards again, where the gas is again separated off. Very small gas bubbles ensure a good transmission of oxygen; agglomeration of the bacteria and suspended particles is prevented by the shear forces occurring. The mixture of waste water, air and bacterial mass flowing downwards in the conduit tube is diverted at the bottom of the reactor and moves steadily upwards in the outer tube. At the upper end of the central tube, part of this mixture is sucked back into the conduit pipe by the suction effect of the two-substance nozzle. The remainder flows out of the reactor and is either sprayed back into the reactor through a nozzle as recycled waste water or is conveyed to a sedimentation tank. In the sedimentation tank this partial current is separated into purified waste water and activated mass. The majority of the activated mass is recycled into the reactor wherein the remainder leaves the plant as bio-sludge. According to the authors, when a plant of this kind is used for the biological purification of municipal as well as industrial waste water (from paper mills, breweries, etc.), loadings per unit of volume of up to 28 kg COD $m^{-3}d^{-1}$ are achieved.

The biological processes for purifying industrial waste water which have been known hitherto are therefore not suitable for the elimination of a variety of organic waste products since they will only act on the chemical substances which are directly degradable biologically, wherein chemical substances which are not directly bio-degradable will leave the plant unchanged and flow into rivers and lakes.

The objective was therefore to provide a process and an apparatus suitable for this process, making it possible to dispose of chemical substances which are not directly bio-degradable. This objective was achieved by making the non-biodegradable products bio-available by chemical oxidation and simultaneously bio-degrading the bio-available products. The prerequisite for this is a high density of microorganisms in the reactor, a high concentration of the products which are to be degraded, which are present as a solution or suspension in water, this being equivalent to minimizing the quantity of water added to a point at which there are still tolerable osmotic conditions for the microorganisms, intensive introduction of gases, namely highly compressed air or oxygen or oxygen/air mixtures, and the simultaneous introduction of oxidizing agents, wherein it is important that the substrate is intensively mixed with air/oxygen while coming into contact with the oxidizing agent for the shortest possible time. Not only the chemical stress but also the mechanical stress on the microorganisms must be kept within these tolerated limits.

The high density of activity required for the aerobic fermentation is only achieved if the air or oxygen or air/oxygen mixtures required are pumped or sprayed into the substrate solution or suspension, which must be at high concentrations, while a liquid or gaseous oxidizing agent is simultaneously added. In other words: large loads must be processed in the smallest possible space, requiring the use of very high constant rates of gas introduction. However, these high gassing rates can only be maintained by the use of special nozzles.

A process which takes into account the criteria mentioned above—particularly the reduction of the quantity of water to the smallest possible volume, simultaneous chemical oxidation and biological degradation as a so-called one-pot reaction, intensive gassing with highly compressed air or air/oxygen mixtures, a short contact time with the oxidizing agent, reduction of the shear forces produced by the nozzle—will result in the rapid disposal of waste present in liquid or suspended form which contains either only bio-degradable substances or, in addition, substances which can only be made bio-available by chemical oxidation. A process of this kind is one of the objects of the invention.

This process can theoretically be used for waste water which is organically highly contaminated, organic suspensions, soluble or suspended solid organic waste which contains bio-degradable substances or substances which can be made bio-available by chemical oxidation.

The invention further relates to a reactor which allows the chemical and biological treatment to be carried out simultaneously. Liquid or gaseous oxidation agents or oxidizing preparations are used for the oxidative treatment. The reactor is so designed that the addition of oxidizing agent, the introduction of air or oxygen and the thorough mixing of the media or the contents of the reactor can be carried out simultaneously.

Figure 1:
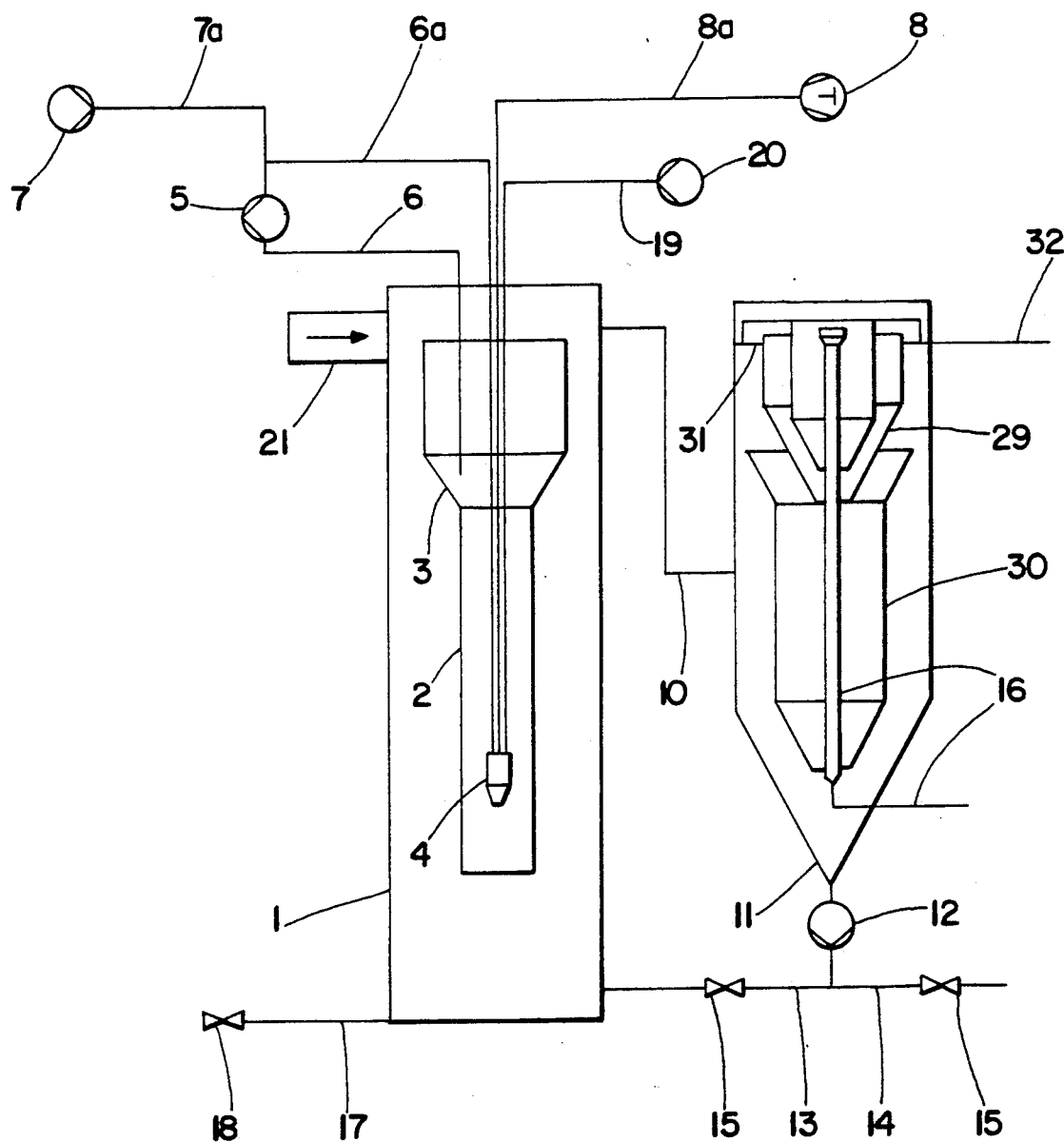
FIG. 1 is a diagram of the reactor employed in the process.

The reactor according to the invention is a so-called loop reactor of compact construction. For a better understanding of the construction of the reactor, reference is made to FIG. 1. The reactor consists of a cylinder (1), the height of which is preferably 3.3 to 8 times its diameter. The diameter itself is 0.5 to 1 m in a preferred embodiment. In the cylinder (1), arranged centrally thereto, is a conduit pipe (2) open at both ends which has at its upper end a deflector (3) which runs conically outwards and is cylindrical at its upper end. In the lower third of the conduit pipe (2) and arranged centrally thereto is a nozzle (4). A pipe for the circulating liquid (6a), a pipe for the supply of gas (air or air/oxygen mixtures) (8a) and a pipe for the supply of oxidizing agent (19) open into this nozzle. In the top or middle part of the interior of the conduit pipe (2) is the beginning of a pipe (6) for circulating the substrate; this pipe (6) is connected via a recycling pump (5) to the pipe (6a) for supplying liquid to the nozzle (4); however, also adjoining this pipe (6a), behind the pump (5), is the substrate supply conduit (7a) which is equipped with a metering pump (7). The fermentation solution or suspension is pumped through the nozzle (4) by means of the pump (5). New substrate is also metered into this circuit through the metering pump (7). The pump (5), metering pump (7) and compressor (8) can be adapted to one another. This adaptation helps to match the operation to the nature of the substrate as far as possible.

The gas (air or air/oxygen mixture) is compressed into the nozzle (4) through the conduit (8a) by means of the compressor (8). On the conduit (19) is a metering pump or a throttle valve (20) for metering the addition of oxidizing agent and possibly also an agent which acts as catalyst for the oxidation. These substances are pumped in or sucked in metered form. An overflow conduit (10), the position of which simultaneously determines the liquid level in the reactor, is connected to a static separator (11). Outside an annular space or a stilling zone (30) created by baffle plates in the separator (11), any air bubbles present are able to rise. Some of the liquid to be clarified passes directly to the pump (12) wherein the remainder goes upwards. Any sludge particles rising are deflected by means of deflector elements (29), and are preferably deflected several times by a system of concentric annular channels, wherein their tendency to sink is intensified. The clarified waste water flows away through the conduit (16). Inside the pipe (30) the particles sink to the conical base. Any floating sludge which may occur is passed over an overflow lip into the catching zone (31) from where it flows away through the pipe (32). The deflector elements (29) are loosely connected to the outlet (16) via the liquid level and the waste water containing the sludge is deflected several times by the deflector elements (29), thereby increasing the length of the sedimentation path. The deflector elements (29) are arranged above the stilling zone (30) in such a way that any precipitated sludge particles inside this zone can drop downwards in order to be discharged by the pump (12). For transporting the thickened sludge by means of a pump (12), the separator (11) is connected both to the reactor by means of the pipe (13) and to a catching tank for receiving the excess sludge, by means of the pipe (14). Valves (15) for regulating the recycling ratio are provided in the pipes (13) and (14).

As a result of the provision of the nozzle (4) deep down at the bottom end of the conduit pipe (2) in the lower third of the reactor, there is a controlled deflection of the jet of waste water at the bottom of the reactor. The small gas bubbles which are released after the jet has been deflected stream upwards along the outside of the conduit pipe. The reactor is emptied via the conduit (17) and the blocking member (18). In the head part of the reactor there is an introduction device (21), e.g. in the form of a screw conveyor, for alternatively loading the reactor with dry substrate. In this case, only water is fed in through the conduit (7a).

Figure 2:
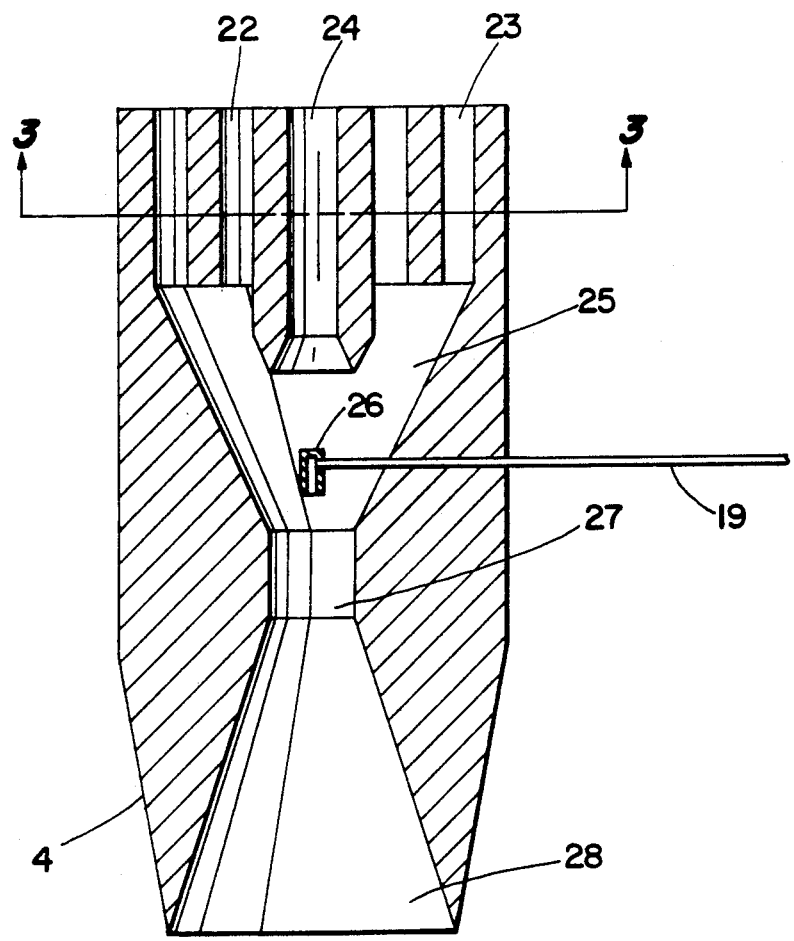
FIGS. 2 and 3 are views of the nozzle utilized in the reactor.
Figure 3:
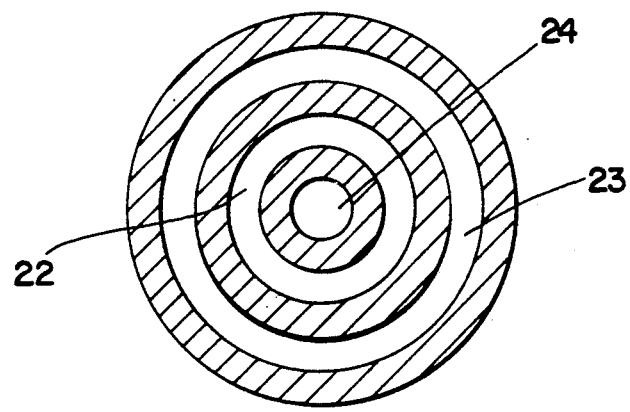

The nozzle (4) makes it possible to supply the reactor intensively with oxygen while subjecting the microorganisms to the minimum mechanical stress (e.g. by shear forces). FIGS. 2 and 3 show the construction of a nozzle of this kind required for this purpose. FIG. 2 is a longitudinal section through the entire nozzle whilst FIG. 3 shows a cross-section through the same nozzle in the upper part thereof. At the upper end of the nozzle are annular gaps (22) and (23) for the controlled introduction both of the substrate which is to be purified and also of the air or an air/oxygen mixture. The annular gap (22) is used for the introduction of air, wherein the outer annular gap (23) and the central bore (24) are used for the introduction of the substrate. The annular gaps (22) and (23) and the central bore (24) open into a premixing chamber (25). In the region of the exit from the premixing chamber there is a nozzle (26) connected to the inflow pipe for the oxidizing agent (19). Shortly after the nozzle (26), the pre-mixing chamber (25) merges into the mixing chamber (27). The diameter of the mixing chamber (27) is such that, as a result of attaining low liquid speeds, the shear forces acting on the micro-organisms are kept as low as possible. The diameter of the mixing chamber (27) is designed so that liquid speeds of from 0.4 to 5 m sec$^{-1}$ are reached. Adjoining the mixing chamber (27) is the funnel-shaped outlet opening (28) of the nozzle (4), also known as the diffusor.

Owing to the fact that the air or an air/oxygen mixture is passed through the annular gap (22) and the substrate (liquid or suspension) is passed through the central bore (24) and the annular gap (23), the air is concentrically enclosed between two inherently rounded columns of liquid. Consequently, intensive mixing of the two media occurs in the pre-chamber (25), resulting in an extremely high transfer of oxygen. However, another important point is that this arrangement ensures a high transfer of substance with fairly low turbulence. For this purpose, it is advantageous if, firstly, the surfaces of the central bore (24) and those of the outer annular gap (23) are as similar as possible and secondly if the ratio of the width of the annular gap (22) to the width or cross-section of the central bore (24) is less than 0.5. The nozzle (26) located shortly before the mixing chamber (27) sprays oxidizing agent into the mixed media; this produces, on the one hand, intensive contact between these media and the oxidizing agent but also, owing to the low-lying position of the nozzle (26), a very short contact time between the media and the oxidizing agent. The combined load resulting from the mechanical and chemical stress exerted on the microorganisms is kept within a range tolerated by the microorganisms by means of the measures referred to above. The positioning of the nozzle in the lower third of the reactor also makes it possible to achieve a good swirling round of the reactor contents even with the very high sludge content in the reactor.

The oxidizing agents used may be gaseous substances such as ozone or ozone-containing air or other gases containing ozone, or, in the case of liquid oxidizing agents, hydrogen peroxide, soluble inorganic or organic peroxides, for example peroxy acids such as perbenzoic acid, peracetic acid, perbutyric acid or other aliphatic or aromatic peracids, and it is also possible to use mixtures of organic acids such as acetic acid with hydrogen peroxide or inorganic acids such as sulphuric acid with hydrogen peroxide, optionally in the presence of catalytically-acting heavy metal salts such as Fe(II) salts.

The chemical and biological clarification process runs as follows:

The substrate (solution or suspension in water) is conveyed by the metering pump (7) through the conduit (7a) and recycling conduit (6) into the reactor until the reactor is full to the level at which the overflow conduit (10) is positioned. The pump (5), depending on its pump delivery, circulates the mixture of substrate and activated sludge through the pipe system (6) and (6a). The output of the pump (5) is selected so that the maximum possible purification is achieved. With the aid of the compressor (8), air is sucked in, for example, and compressed through the annular gap (22) of the nozzle (4). The pump (5) bring about the intimate contacting of the substrate/activated sludge mixture and air or air-/oxygen mixture required for the intensive exchange of substances in the pre-chamber (25), via the conduit (6a) and the annular gap (23) or central bore (24) of the nozzle (4), as the air or this air/oxygen mixture is enclosed on all sides by the substrate/activated sludge mixture and is intensively mixed with the substrate in the pre-chamber. At the same time, the oxidizing agent is metered in through the nozzle (26). After a very short retention time in the mixing chamber (27) itself, this mixture hits the base of the reactor, forming a nozzle jet, and this jet is deflected from the base and flows upwards in the space between the outer walls of the conduit pipe (2) containing the nozzle (4) and the inner wall of the reactor (1). An optimum backflow ratio is achieved via the separator (11), by means of the pump (12) and valves (15). After a certain retention time in the reactor, which can be manipulated from outside by adjusting the pump deliveries of the pumps (5) and (7), the power of the compressor (8), the metering device (20) for the oxidizing agent and the backflow ratio in the separator circuit, some of the clarified liquid is discharged through the outlet (16) and some of the activated sludge is discharged through the outlet (14); these quantities are then replaced by the addition of new substrate which is pumped in by the pump (7). The separator (11) is so operated that the quantity flowing through the conduit (13) and valve (14) is greater than the quantity of clarified liquid discharged through the conduit (16). The separation of the sludge particles takes place inside the stilling zones (30) and (29) where there is the absence of turbulence required for sedimentation. The volume of the separator (11) is of the same order of magnitude as that of the reactor (1).

Generally, the operating temperature required is automatically established inside the reactor. However, it is advantageous if this temperature can also be regulated from outside since temperatures above 60° C. and below 20° C. should not occur.

The performance of the reactor according to the invention can be given a) by the COD value (=chemical oxygen demand, namely the quantity of oxygen which is required to oxidize any organic material present in a substrate completely into $CO_2$ and $H_2O$, in oxidation with chromium sulphuric acid), b) by data concerning the load per unit of volume (=kg COD inflow per unit of reactor volume) and c) the DM value (the DM value specifies, in grams, the dry matter per liter of substrate/activated sludge mixture) as follows:

The COD value attains levels of up to 1,000,000 mg COD/liter; by comparison, for municipal waste water, on inflow, it is 400–800 mg COD/liter and for industrial waste water it is 2000 to 10,000 mg COD/liter.

The loading per unit of volume with regard to COD is up to about 80 g/liter for the reactor according to the invention whereas, by comparison, in a municipal plant it is up to 0.5 g/liter and in an industrial plant it is up to 1.5 g/liter (these values also depend on the salt content). The degradation performance is about 60–80 kg COD $m^{-3}d^{-1}$.

The performance in terms of dry matter DM is between 5 to 180 g DM/liter, depending on the dimensions of the thickener and the substrate inflow concentration in the reactor according to the invention; the upper limit is attained when the sludge becomes so thick that it can no longer be adequately fluidized or separated (the figures for municipal plant are 3 to 8 g DM/liter, by comparison).

Another advantage of the reactor according to the invention is that it takes up little space; this compact construction even enables the entire plant to be loaded onto a truck and thus gives the clarifying plant a mobility which it has never had before.

Figure 4:
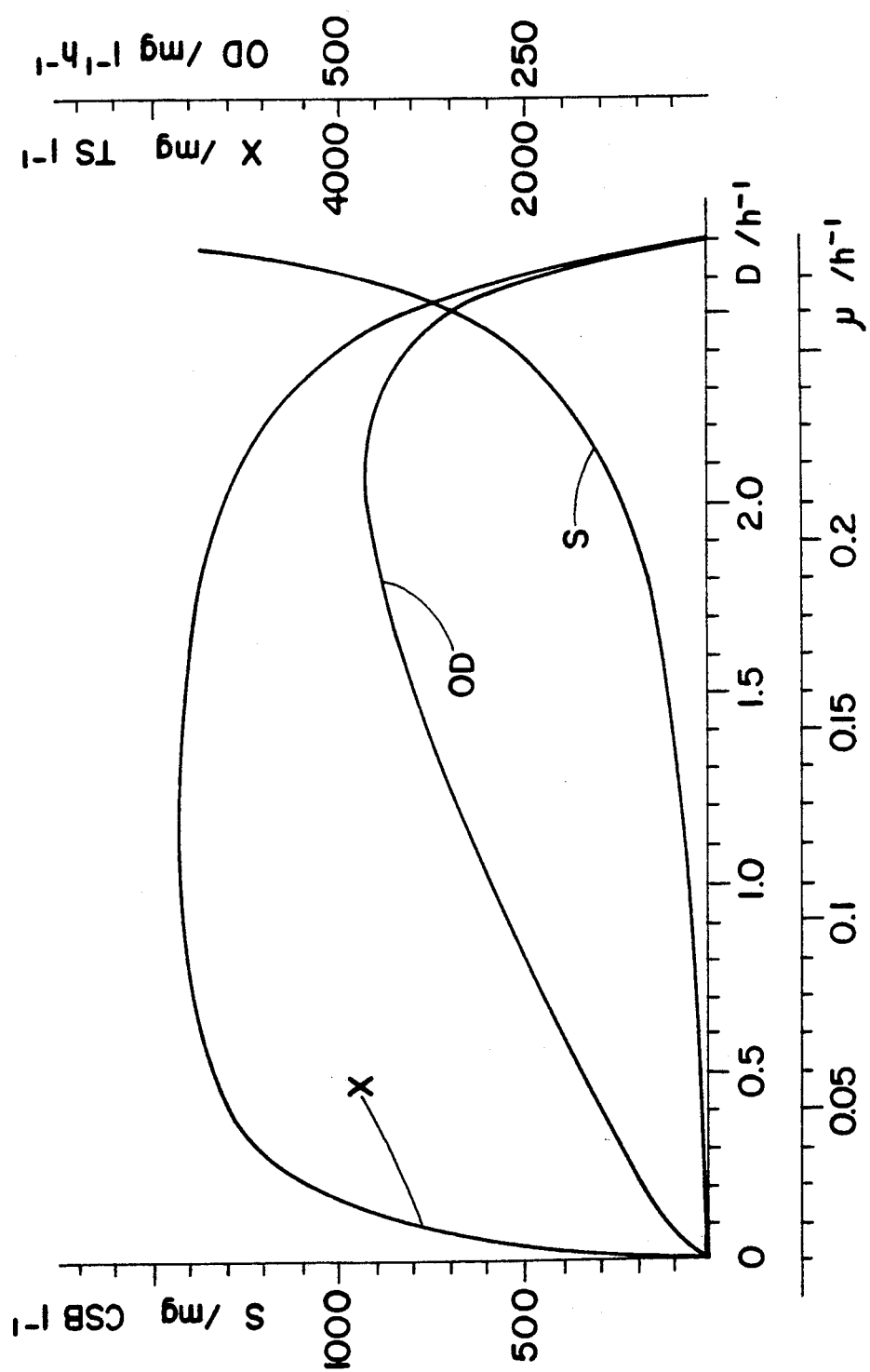
FIG. 4 is an equilibrium diagram for aerobic waste water treatment.

In order to explain the range of use of the reactor, FIG. 4 shows an equilibrium diagram of aerobic waste water treatment based on the data of Wiesmann (U. Wiesmann, "Kinetik der aeroben Abwasserreinigung durch Abbau von organischen Verbindungen und durch Nitrifikation", VDI Reports No. 607, 1986, pages 1597-1624). X indicates the concentration of active biomass (mg DM/liter), S indicates the concentration of substrate (mg/liter), where the biologically available proportion of the COD is regarded as the substrate, OD is the oxygen uptake rate of the organisms (mg·liter$^{-1}$·h$^{-1}$), D is the specific throughflow rate (reciprocal value of the retention time, also known as the sludge age in the art of clarification) and u is the specific growth rate of the organisms. Both quantities have the unit h$^{-1}$. For the calculation, it was assumed that, with the aid of the separator, the biomass in the reactor was increased ten fold compared with the operation without a separator. The inflow concentration for the substrate for this example was 1375 mg COD/liter.

Reference is made particularly to the pattern of the substrate concentration in the reactor (curve S). In "conventional" activation tanks, outlet values of for example 10 mg COD/liter are sought, if only the bio-degradable COD is considered. Accordingly, through-flow rates of D 0.05 h$^{-1}$ are set up, corresponding to a retention time of 20 h. By contrast, the reactor according to the invention operates at throughflow rates of up to 2 h$^{-1}$, i.e. retention times of 0.5 h. The outlet value of the substrate is in this case about 300 mg COD/liter (and again this refers only to the bio-degradable COD). Thus, it is not possible to attain the outlet values of "conventional" biology using this reactor. Nor was this an objective. The essential feature for operation of the chemical oxidation with oxidizing agents harmful to the organisms is rapid regrowth of the organisms, which is the only way of ensuring survival of the active biomass in the reactor. However, the fastest growth can only be achieved at high throughflow rates. FIG. 4 shows the specific growth rate u equivalent to a specific through-flow rate, in order to clarify this situation in terms of the order of magnitude. The rapid growth of the organisms makes effective gassing absolutely essential, which must prevent oxygen limitation of growth.

The waste water discharged from this plant (conduit 16) must therefore be fed into a second activation stage where degradation to the required degree of purity then takes place over long retention times.

As a result, there is the possibility of using this second stage not only to select organisms which can specialize more effectively on the remaining substrates but also to promote the nitrification in this stage or even to make it possible for the first time, by using the gassing air leaving the reactor to aerate the second stage, the $CO_2$ contained therein serving as a carbon source for nitrifying organisms.

The process according to the invention has two major advantages over the conventional processes:
1. it makes it possible to eliminate substances which are otherwise not readily degradable by chemical oxidation in the biological reactor and
2. when the material released through the outlet (16) is repurified in a second stage to very low outlet values, 30 to 40% of the gassing air can be saved compared with the conventional one-stage process.

The following Example illustrates a biolysis of solid, powdery residues from drugs manufacture and the results achieved.

EXAMPLE

Residues from drugs manufacture, consisting mainly of sugars, carboxymethyl cellulose and other excipients together with 10% of components which were not directly bio-degradable, such as active substances, were placed in a reactor according to the invention 500 mm in diameter and 2300 mm high. The liquid content was 500 l. The residues were mixed to a mash in water, in the ratio 500 g of residue per liter of water. The COD of the mash was 500 kg/m$^3$. Sludge from an existing industrial waste water treatment plant was used as the inoculum. The reactor was operated at a load per unit volume of 25 kg COD m$^{-3}$·d$^{-1}$. The recirculation of the fermented liquor through the nozzle was at the rate of 12 m$^3$/h, whilst 20 m$^3$/h of air were introduced. A pH of 6.5 was established, the dissolved oxygen content of the fermentation liquor was 2.0 mg/l and the temperature was 38° C. The material discharged had still a COD of 2 g/l and could therefore readily be fed into an industrial waste water treatment plant. The organic dry substance in the reactor was 40 g/l; the power required was, in total, 3.4 kW/m$^3$.

Chemical oxidation was carried out by introducing 67 ml/h of perhydrol into the nozzle.

The degree of degradation in terms of COD, without the addition of perhydrol, was 89.7%, wherein that with perhydrol was 99.6%. This result clearly shows that virtually all the constituents which were not directly bio-degradable were picked up.

What is claimed is:

1. A process for the simultaneous chemical and biological treatment of waste water containing organic material which is at least partially nonbiodegradable, said process comprising the steps of:
   a) inoculating a reservoir containing waste water intended for treatment with microorganisms capable of aerobically degrading biodegradable contaminants in the waste water;
   b) withdrawing a stream of waste water from the reservoir;
   c) introducing the stream of waste water so withdrawn from the reservoir into a mixing zone and intimately mixing the stream of waste water with compressed air or oxygen, so that the dissolved oxygen concentration in the waste water rises to a level which is sufficient to support aerobic metabolism by the microorganisms, and with an oxidizing agent, so that the localized concentration of oxidizing agent in the mixing zone rises to a level which is sufficient to effect chemical oxidation of organic contaminants in the waster water while in the mixing zone;
   d) returning the stream of waste water treated in step (c) to the reservoir, whereby the concentration of oxidizing agent in the stream is reduced, by mixing with the relatively larger quantity of waste water in the reservoir mixture, to a point where it is not toxic to the microorganisms; and,
   e) continuously repeating steps (b) through (d) until the concentration of organic contaminants in the water falls to a desired level.

2. The process of claim 1 wherein, in step (c), said waste water is mixed with said air or oxygen and said oxidizing agent utilizing a nozzle which comprises:
   1) an inlet for admission of the waste water into said nozzle;
   2) means downstream from said inlet for dividing said waste water into a central stream and an annular stream which concentrically encloses said central stream;

3) inlet means for introducing said compressed air or oxygen between said central stream and said annular stream of waste water;
4) a premixing chamber for premixing said central and annular streams of waste water with said compressed air or oxygen;
5) inlet means for introducing said oxidizing agent into said premixing chamber; and,
6) a mixing chamber, downstream of said premixing chamber, for intimately mixing said waste water, air or oxygen, and oxidizing agent.

3. The process of claim 1 wherein a stream of untreated waste water is continuously introduced into the reservoir while a substantially equal amount of treated water is continuously withdrawn therefrom.

4. A process for the continuous treatment of waste water containing organic material which is at least partially nonbiodegradable, said process comprising the steps of:
a) inoculating a reservoir containing waste water intended for treatment with microorganisms capable of aerobically degrading biodegradable contaminants in the waste water;
b) withdrawing a stream of waste water from the reservoir;
c) introducing the stream of waste water so withdrawn from the reservoir into a mixing zone and intimately mixing the stream of waste water with compressed air or oxygen, so that the dissolved oxygen concentration in the waste water rises to a level which is sufficient to support aerobic metabolism by the microorganisms, and with an oxidizing agent, so that the localized concentration of oxidizing agent in the mixing zone rises to a level which is sufficient to effect chemical oxidation of organic contaminants in the waster water while in the mixing zone, wherein said waste water is mixed with said air or oxygen and said oxidizing agent utilizing a nozzle which comprises:
1) an inlet for admission of the waste water into said nozzle;
2) means downstream from said inlet for dividing said waste water into a central stream and an annular stream which concentrically encloses said central stream;
3) inlet means for introducing said compressed air or oxygen between said central stream and said annular stream of waste water;
4) a premixing chamber for premixing said central and annular streams of waste water with said compressed air or oxygen;
5) inlet means for introducing said oxidizing agent into said premixing chamber;
6) a mixing chamber, downstream of said premixing chamber, for intimately mixing said waste water, air or oxygen, and oxidizing agent; and,
d) returning the stream of waste water treated in step (c) to the reservoir, whereby the concentration of oxidizing agent in the stream is reduced by mixing with the relatively larger quantity of waste water in the reservoir mixture to a point where it is not toxic to the microorganisms;
e) continuously repeating steps (b) through (d) so that the concentration of organic contaminants in the water falls to a desired level; and,
f) continuously introducing a stream of untreated waste water into the reservoir while withdrawing a substantially equal amount of treated water therefrom.

* * * * *